United States Patent [19]

Baek et al.

[11] Patent Number: 5,831,659
[45] Date of Patent: Nov. 3, 1998

[54] METHOD AND APPARATUS FOR WRITING ELLIPTICAL SPOTS ON A THERMAL MEDIA

[75] Inventors: Seung H. Baek, Pittsford; Kurt M. Sanger, Rochester; Suzanne K. Wyatt, Henrietta, all of N.Y.

[73] Assignee: Eastman Kodak Company, Rochester, N.Y.

[21] Appl. No.: 431,231

[22] Filed: Apr. 28, 1995

[51] Int. Cl.$^6$ .................................. B41J 2/45; B41J 2/47; B41J 2/435
[52] U.S. Cl. ............................ 347/238; 347/248
[58] Field of Search .................................. 347/238, 234, 347/237, 244, 248

[56] References Cited

U.S. PATENT DOCUMENTS

| | | | |
|---|---|---|---|
| 4,253,102 | 2/1981 | Kataoka et al. | 347/234 |
| 4,924,321 | 5/1990 | Miyagawa et al. | 358/296 |
| 5,164,742 | 11/1992 | Baek et al. . | |
| 5,241,328 | 8/1993 | Sarraf et al. | 347/237 |
| 5,258,776 | 11/1993 | Guy et al. | 347/237 |
| 5,278,578 | 1/1994 | Baek et al. . | |
| 5,367,381 | 11/1994 | Curry | 358/298 |
| 5,475,416 | 12/1995 | Kessler et al. | 347/244 |
| 5,485,289 | 1/1996 | Curry | 358/448 |
| 5,574,491 | 11/1996 | Paoli | 347/248 |

FOREIGN PATENT DOCUMENTS

| | | |
|---|---|---|
| 0 240 347 A2 | 10/1987 | European Pat. Off. . |
| 544002 | 6/1993 | European Pat. Off. . |

OTHER PUBLICATIONS

"A Continuous Tone Laser Color Printer", Firth et al., Journal of Imaging Technology, Jun. 1988.

"MIF Analysis and Spot Size Selection For Continuous Tone Laser Printers", Yip et al., Journal of Imaging Technology, Oct. 1989.

"Laser Scanning for Electronic Printing", Urbach et al., Proceedings of the IEEE, Jun. 1982.

Abstract of JP63–73584, Apr. 4, 1988, Yoshindri Oota, "Heat Sink for Array Semiconductor Laser".

Abstract of JP 56–112789, Sep. 5, 1981, Naoto Mogi, "Semiconductor Device".

Abstract of JP59204292, Nov. 19, 1984, Isao Hakamata, "Semiconductor Device".

Abstract of JP 3–48477, Mar. 1, 1991, Shigeki Kitajima, "Semiconductor Laser Device".

Abstract of JP 4–115585, Apr. 16, 1992, Yutaka Yamanaka, "Array Type Semiconductor Laser Device and Manufacture".

Abstract of JP 5–283815, Oct. 29, 1993, Toshitaka Aoyanagi, "Array Laser".

*Primary Examiner*—N. Le
*Assistant Examiner*—Thinh Nguyen
*Attorney, Agent, or Firm*—Nelson Adrian Blish

[57] ABSTRACT

A system that includes multiple, elliptical writing spots produced by a single, integrated laser diode array head. The beams, generated by the array and shaped by beam shaping optics into the elliptical spots, are scanned across a thermal media writing plural lines at the same time. The elliptical writing spots have an energy profile and a concatenated, angular orientation and staggered arrangement that, due to the thermal interaction of the spots on the media, creates substantially Gaussian thermal profiles in the media.

4 Claims, 5 Drawing Sheets

METHOD AND APPARATUS FOR WRITING ELLIPTICAL SPOTS ON A THERMAL MEDIA

BACKGROUND OF THE INVENTION

1. Field of the Invention

The present invention is directed to an apparatus and method for writing elliptical writing spots on a thermally sensitive media and, more particularly, to an integrated, multiple laser writing head system that writes multiple elliptical spots simultaneously, with the writing direction being substantially transverse to a long axis of the elliptical writing spots and in which the spots are shaped, aligned and oriented to reduce crosstalk between lines within the same writing head pass and between passes by the head.

2. Description of the Related Art

Writing devices, called flying spot writers, perform writing on a visible light sensitive media with a single beam spot that is elliptically shaped. These writers move the single spot relative to the axes of the beam in a direction that is strictly perpendicular to the long axis of the ellipse and coincident with the short axis. Because the beam is not a thermal irradiation type beam but a visible light type beam and the media is silver-halide, crosstalk between the beam swaths does not occur. This type of writing device is described in "A Continuous Tone Laser Color Printer", Firth et al., Journal of Imaging Technology, June 1988; "Laser Scanning For Electronic Printing", Urbach et al., Proceedings of the IEEE, June 1982 and "MTF Analysis and Spot Size Selection For Continuous Tone Laser Printers", Yip et al., Journal Of Imaging Technology, October 1989. Because these flying spot writers only use a single beam, the time required for completely writing a typical media of approximately 15 inches by 20 inches is also excessive.

Typical thermal print heads that simultaneously write with multiple writing spots include plural round laser writing spots 10 as illustrated in FIG. 1, where the view is into the end of an optical fiber head with fibers 12 projecting the spots 10 onto a thermally sensitive media (not shown). This type of thermal writing head is moved relatively with respect to the thermally sensitive media in a fast scan direction 14 corresponding to a rotational direction of a drum on which the thermally sensitive media is mounted. This results in writing parallel lines in the fast scan direction on the media. The amount or density of thermal energy transferred to the media is controlled by the intensity of the beams and the speed at which the drum rotates. The written lines are also generally at a slight angle θ to the orientation of the drum on which the thermally sensitive media is mounted because the head is typically constantly moved in a slow scan direction along the drum axis as the drum rotates.

Each of the writing spots of the multiple spot writers is assumed to have an approximately Gaussian intensity profile 20 as depicted in FIG. 2. However, because the neighboring spots interior of the head are applying thermal energy to the media at substantially the same time, the actual energy transfer profile 22 is not Gaussian, particularly above the thermal sublimation threshold 24 of the typical thermal material. This results in thermal energy crosstalk between the spots as illustrated in the thermal energy profiles of FIG. 3a where the profile of a first spot 30 and a second spot 32 creates a combined thermal profile 34 with a crosstalk peak 36 between the spots. The effect of this crosstalk, as illustrated in FIG. 3b, is for the first spot to remove material in a sublimation profile 40 that reflects the thermal energy transfer profile 30 of the first spot. However, the second spot, because of the residual energy of the first spot, creates a sublimation profile 42 that reflects or is the inverse of the thermal profile 34 and that includes a trough 44 between the spots or lines where excess material has been removed from the thermal media resulting in excessive light transmission through the media. This produces an interbeam banding artifact between the lines of a single pass resulting in a reduced quality image that can exhibit Moire effects.

In such multiple beam writing heads another problem occurs between successive passes or swaths of the head for a similar reason. In these multiple beam writing heads the beams on the outside edges of the head do not have adjacent beams. Because the time between adjacent passes is long compared to the cooling rate of the media the edge beams on the outside do not suffer from the excess thermal energy crosstalk of the interior beams but suffer from insufficient energy transfer on the outside. This slight imbalance is illustrated in FIG. 2 by the difference in center and shape of the profiles 20 and 22 particularly along the threshold 24. This interswath crosstalk is more particularly illustrated in FIGS. 4a and 4b. The energy transfer profiles 50 and 52 of adjacent passes includes a trough 54 which results in a sublimation profile 60 with a peak 62 where not enough material has been removed from the thermal media, resulting in reduced light transmission through the media. This produces an interswath banding artifact located between passes that is different from the interbeam artifact occurring within the beams of a single pass. This also reduces image quality and causes Moire effects. To solve this interswath problem, dummy channels or beams are added to the outside edges of the head to perform preheating and postheating of the thermal media material as described in U.S. Pat. Nos. 5,164,742 and 5,278,578, the teachings of which are incorporated herein.

What is needed is a multiple beam writing head that does not require dummy beams thereby reducing writing head costs, and that reduces interbeam and interswath artifacts to improve thermal image quality.

SUMMARY OF THE INVENTION

It is an object of the present invention to provide a multiple, elliptical beam writing head system.

It is another object of the present invention to provide a system that reduces interbeam artifacts.

It is also an object of the present invention to reduce interswath artifacts.

It is an additional object of the present invention to provide a system that does not require dummy beams.

It is a further object of the present invention to provide half tone as well as continuous tone thermal printing using multiple elliptical beams.

The above objects can be accomplished by a system that includes multiple elliptical writing spots produced by a single, integrated laser diode head where the spots are scanned across a thermal media writing plural lines at the same time. The elliptical writing spots have an energy profile that, due to the thermal interaction of the spots on the media, creates substantially Gaussian thermal profiles in the media resulting in reduced crosstalk.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 5:
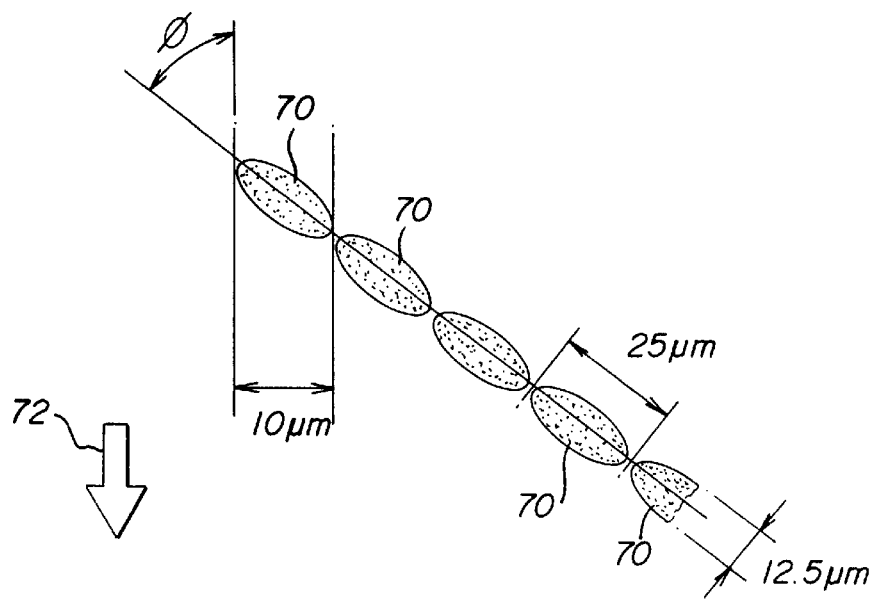
FIG. 5 depicts writing spots according to the present invention.

The present invention eliminates the need for dummy beams and reduces crosstalk between beams within a single swath and between swaths by providing plural elliptical writing spots 70, as illustrated in FIG. 5. It is preferred that the head create at least three spots with about 10 spots preferred, however, more or fewer spots can be created as desired without sacrificing the improvements provided by the present invention. The spots 70 are preferably laser beam, thermal irradiation type spots but could be created using other types of technology, such as resistive elements. Each spot preferably has a major or long axis length of about 25 $\mu$m and a minor or short axis length of about 12.5 $\mu$m, resulting in a 2:1 aspect ratio, although other dimensions and aspect ratios are possible. The shape of the spots 70 contributes to the creation of approximately Gaussian thermal profiles 80 and 82 in the media along both the major and minor axes, especially above the sublimation threshold 84, as respectively illustrated in FIGS. 6a and 6b. The spots 70 are simultaneously and relatively moved in a direction 72 that is coincident with the fast scan direction and substantially transverse or perpendicular to the major axis, as indicated in FIG. 5. This scanning is accomplished by rotating the drum with the media thereon in front of the scan head with the spots 70 focused on the media. The thermal media film or donor/receiver which is scanned or irradiated can include thermal material used as a negative and as a positive as well as the thermal metal plates used for offset color printing or any other thermal media that responds to high temperature. The spots 70 are concatenated and aligned with their long axes coincident and at an angle with respect to the scan direction 72. The spots are also staggered at an angle $\phi$ of between a minimum of about 27 degrees and a maximum of about 79 degrees with respect to the fast scan direction 72 with 68 degrees being preferred. An angle of 68° results in a beam width in the fast scan direction 72 or alternately a line spacing in the slow scan direction of about 10 $\mu$m. The angling of the concatenated and aligned beams by at least the minimum also contributes to the creation of approximately a Gaussian thermal profile in the media. The angle $\phi$ also controls the separation of the written lines on the media and adjusts the resolution from about 1200 dots-per-inch (dpi) to about 5000 dpi.

Figure 1:
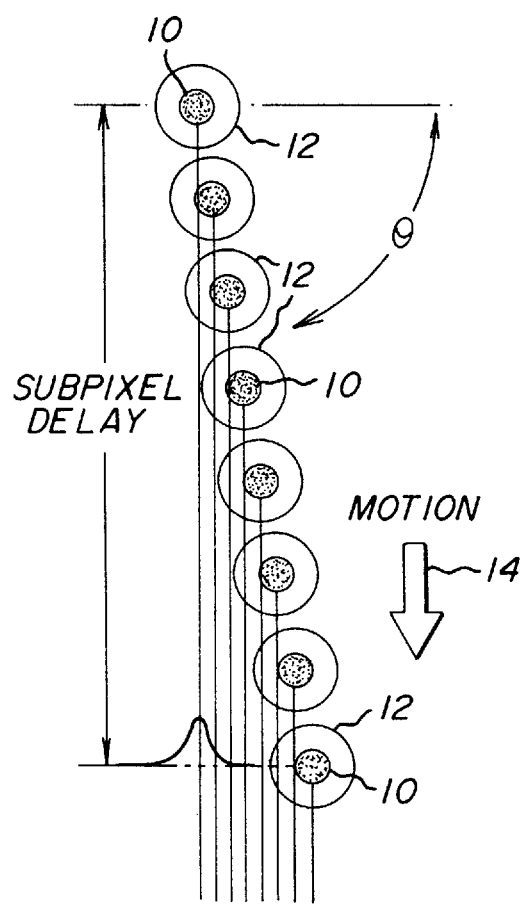
FIG. 1 illustrates a conventional round spot multiple beam print head and swath.
Figure 2:
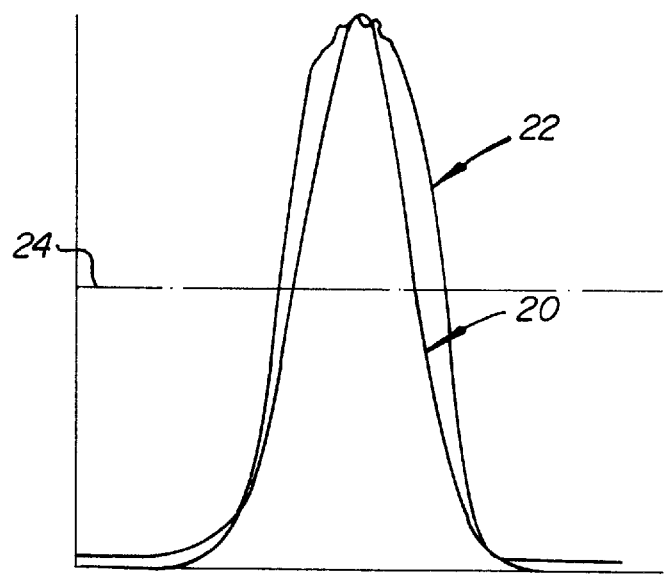
FIG. 2 depicts a laser intensity profile of a conventional round beam as compared to an ideal Gaussian profile.
Figure 3A:
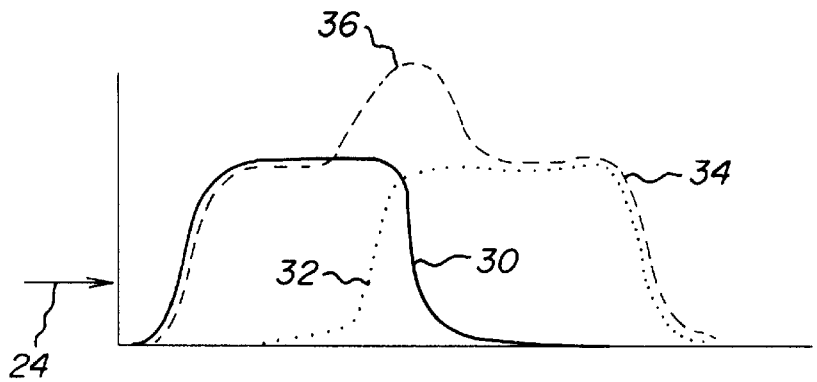
FIGS. 3a and 3b illustrate crosstalk between conventional round beams.
Figure 3B:
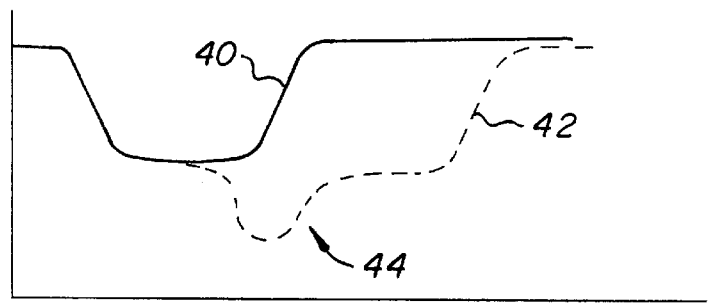
Figure 6A:
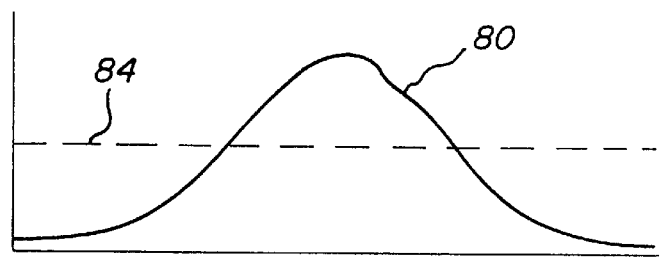
FIGS. 6a and 6b illustrate profiles of an elliptical spot along the major and minor axes.
Figure 6B:
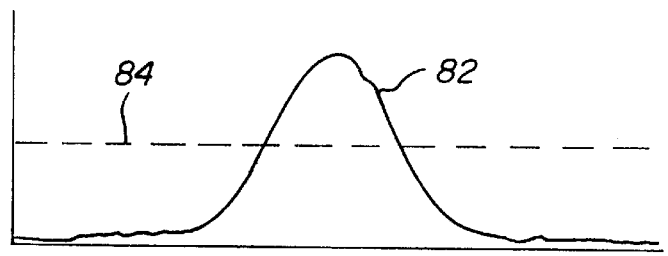
Figure 7A:
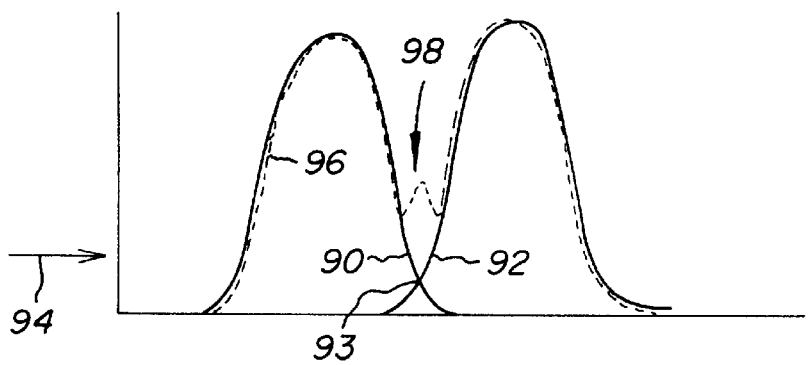
FIGS. 7a and 7b show thermal and sublimation profiles of beams within a head according to the present invention.
Figure 7B:
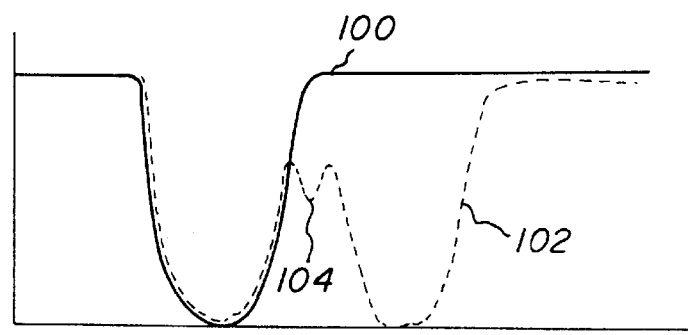

By creating spots as illustrated in FIGS. 5, 6a and 6b, the present invention reduces the interspot thermal crosstalk in a direction perpendicular to the fast scan direction as illustrated in FIGS. 7a and 7b. As shown, neighboring beams create Gaussian shaped profiles 90 and 92 which do not overlap above the sublimation threshold 94. Ideally, the profiles would cross at point 93 which is 50% of the peak for minimum ripples and ideally the sublimation threshold 94 and the crossing point 93 are at the same level. These two profiles 90 and 92 combine to produce a thermal profile 96 in which the peak 98 created in the prior art is substantially reduced. The profile 96 between the spots is above the sublimation threshold 94, so that the space between lines is heated to above the sublimation temperature and dye material is removed. This removal is illustrated in FIG. 7b where the material clean-out or sublimation profile 100 of the first spot when joined with that of the second spot creates a combined profile 102 with improved interspot characteristics especially at the point 104 between beams where the excess removal artifact 44 of the prior art has been corrected as is illustrated by comparing FIG. 3b with FIG. 7b.

Figure 4A:
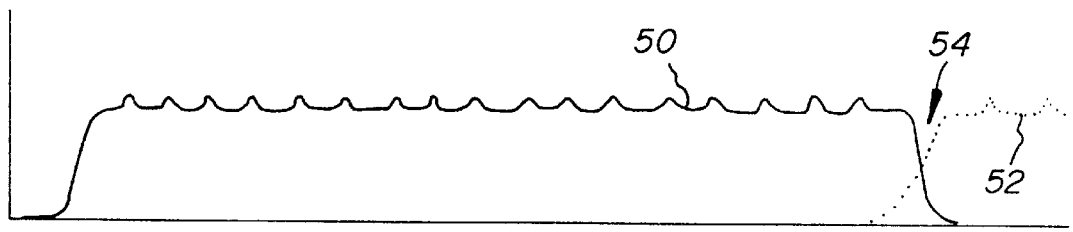
FIGS. 4a and 4b illustrate crosstalk between head swaths.
Figure 4B:
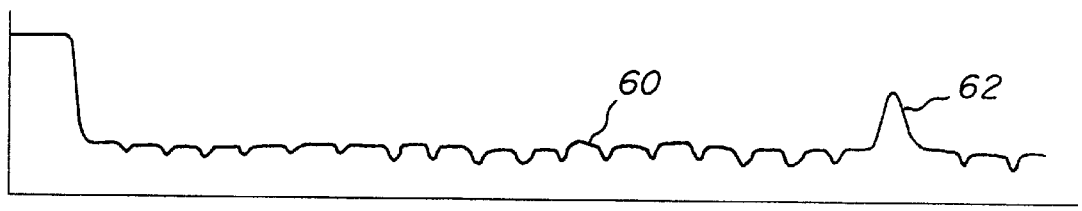
Figure 8A:
FIGS. 8a and 8b depict swath profiles according to the present invention.
Figure 8B:
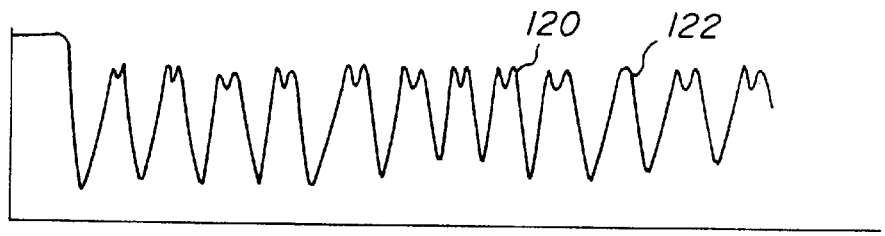

The shapes of the beams and the orientation also contribute to reducing the interswath artifact 62 (FIG. 4b) as illustrated in FIGS. 8a and 8b. FIG. 8a illustrates the thermal profiles 110 and 112 of adjacent swaths made by a print head according to the present invention that does not include dummy beams and in which the adjacent swaths 110 and 112 are made about 30 milliseconds apart. As can be seen, the beam profiles 110 and 112 at the edge of each swath overlap. This creates a material transfer profile 120, as illustrated in FIG. 8b, where the material between swaths is effectively removed, producing an improved interswath profile 122. This removes the prior art excess material artifact 62 between swaths as can be seen by comparing FIG. 4b with FIG. 8b.

Figure 9:
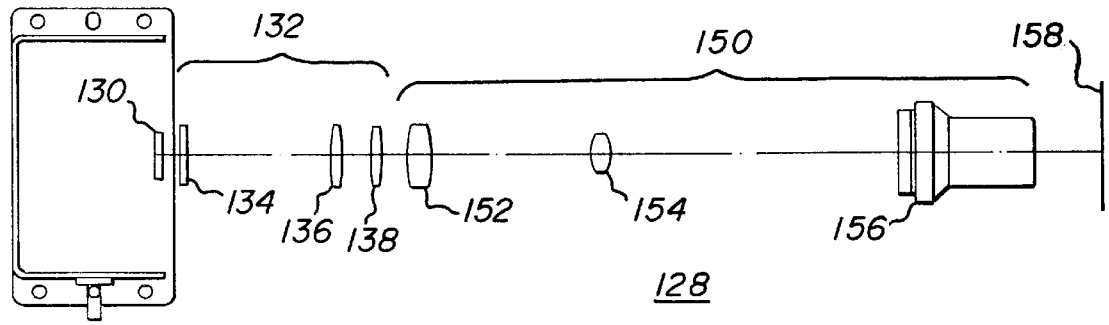
FIG. 9 depicts head array and lens arrangement according to the present invention.

The print head 128 of the present invention preferably includes integrated laser diode arrays 130, as illustrated in FIG. 9 and manufactured by Spectra Diode Inc. Suitable integrated arrays 130 are also available from RCA and others. The print head could alternately be of the optical fiber type where beams from discrete diode lasers are gathered into a linear array by optical fibers. The beams from the laser diode array 130 are shaped by beam forming optics 132 which shape the beams from the diodes into elliptical writing spots. The lenses 134, 136 and 138 of the beam forming optics 132, one of which is not shown because it is so small and located very close to the arrays 130, are lenses available from manufacturers, such as Harold Johnson Lab of Gardena, Calif., Eastman Kodak Co. and others, and suitable lenses from other sources could be selected and substituted by a person of skill in the art. The lenses are also arranged in a conventional configuration suitable for creating elliptical spots and the arrangement is within the skill in the optical lens art. The head 128 also includes focusing optics 150 including an amplifying eyepiece 152 and 154 and an objective 156, and are available from the Harold Johnson Lab, Bausch and Lomb, Optem International and Eastman Kodak Co., among others. The optics 150 focus the beams onto a thermal media 158 mounted on a rotating drum and the head is conventionally moved along the drum axis as the drum rotates with the intensity of the beams varying with the write data. The laser spots remove or ablate material from the media 158.

Figure 10:
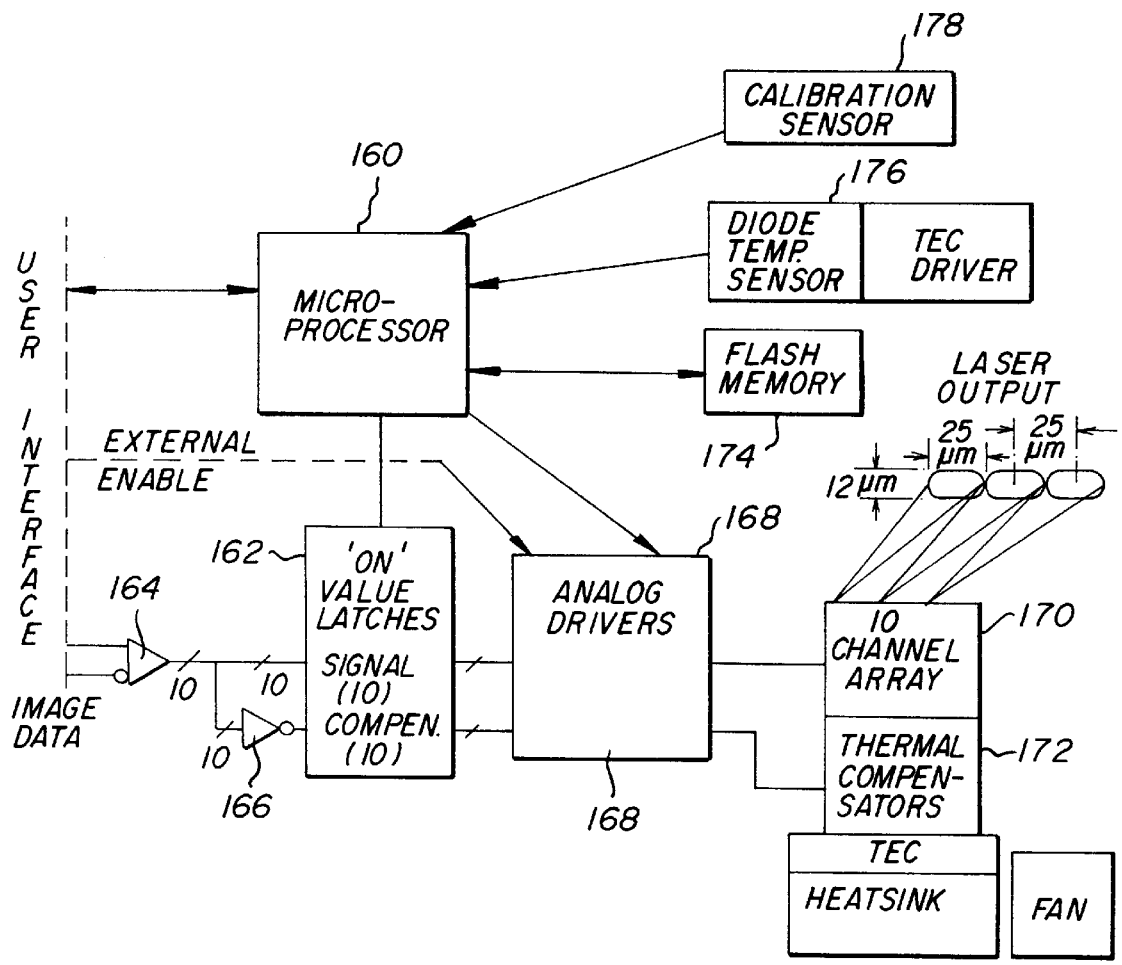
FIG. 10 illustrates electronic components of the head.

The activation and control of the lasers of the diode array 130 is controlled by conventional electronic devices, as illustrated in FIG. 10, which are controlled in a conventional fashion. A microprocessor 160 controls latches 162 to pass the image data from data invertors 164 and 166 to analog drivers 168 for each diode of the array 170 where the diodes can produce about 1.1 Watts each. Associated with each diode is a thermal compensator 172 that maintains the diodes at the same operating temperature. The head electronics also include appropriate memory 174, temperature sensors 176 and a calibration sensor 178.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of writing a thermal media, comprising the steps of:

forming writing spots; and scanning the writing spots across the thermal media in adjacent swaths wherein said writing spots have optical intensity profiles causing corresponding thermal profiles in the thermal media and said thermal profiles intersect each other at a point that is approximately 50% of a peak thermal intensity, thereby removing a material on said thermal media between said swaths.

2. A method as recited in claim 1, wherein each of the writing spots are elliptical and are concatenated at an angle with respect to a direction of the scanning.

3. A method as recited in claim 1, wherein each of the writing spots are elliptical and have a long axis and a short axis such that an aspect ratio of the long axis to the short axis is 2:1.

4. A method as recited in claim 1, wherein said writing spots are elliptical and scanning is in a direction substantially transverse to a major axis of each of the writing spots.

* * * * *